Feb. 16, 1937.    R. C. HUGHES    2,070,661
SPRING TOGGLE ACTION SHUT-OFF VALVE
Filed April 12, 1934    2 Sheets-Sheet 2

Inventor
RALPH C. HUGHES
By Frank D. Gray
Attorney

Patented Feb. 16, 1937

2,070,661

UNITED STATES PATENT OFFICE 2,070,661

SPRING-TOGGLE ACTION SHUT-OFF VALVE

Ralph C. Hughes, Anderson, Ind., assignor to Reynolds Gas Regulator Co., Anderson, Ind., a corporation of Indiana Application April 12, 1934, Serial No. 720,241

2 Claims. (Cl. 137—153)

This invention relates to a new and improved spring-toggle action shut-off valve and involves especially such a valve which operates by "snap" action. It is adapted to include spring mechanism which applies a pressure to the valve as ordinarily adjusted, to close the latter, but also includes a diaphragm casing communicating with the main valve casing so arranged that pressure normally applied against the under surface of the diaphragm opposes the pressure of the spring mechanism, and holds the valve open, while decrease of pressure beneath the diaphragm permits release of certain spring actuating mechanism to cause the valve to be closed by the spring mechanism.

It is an object of my invention to permit flow of fluid through the normally-open valve from inlet to outlet ports of the main casing while normal pressure is maintained in the casing, but will automatically close the valve when the pressure decreases, and will so close such valve positively and suddenly, and retain it in closed position until the spring toggle mechanism is released manually by a force applied to a knob on a projecting rod conveniently positioned for such operation. This will reset the valve in open position provided the pressure of the fluid beneath the diaphragm is adequate to overcome the force of the spring mechanism for which it has been adjusted. Such adjustment may be made for any predetermined force desired.

Other and further objects of my invention will be hereinafter set forth, the structure of my mechanism described and explained, and the novel features thereof defined by the appended claims.

A preferred embodiment of my new and improved valve mechanism is herein illustrated in the accompanying drawings in which,—

Figure 1:
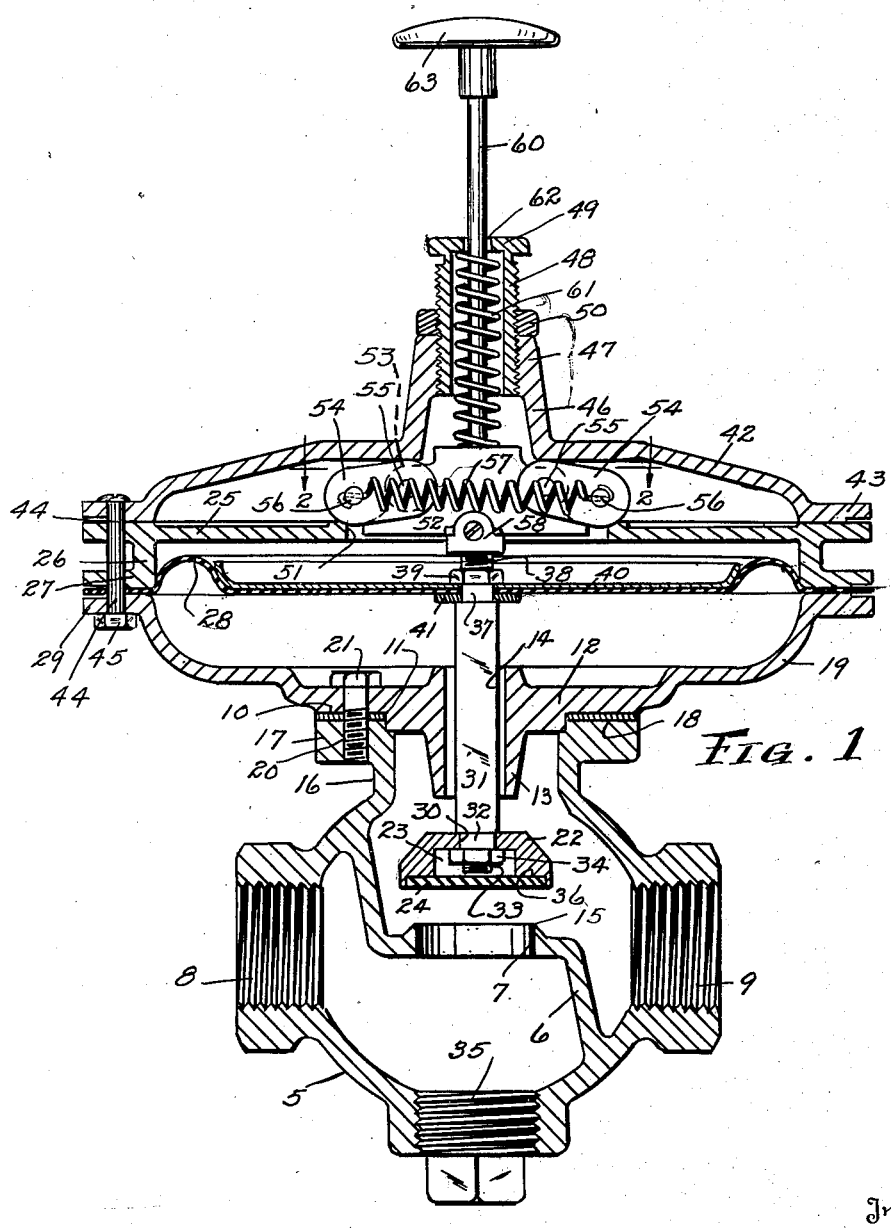
Figure 1 is a central, vertical section of the device showing the parts assembled and in position thereof when the valve is open.
Figure 3:
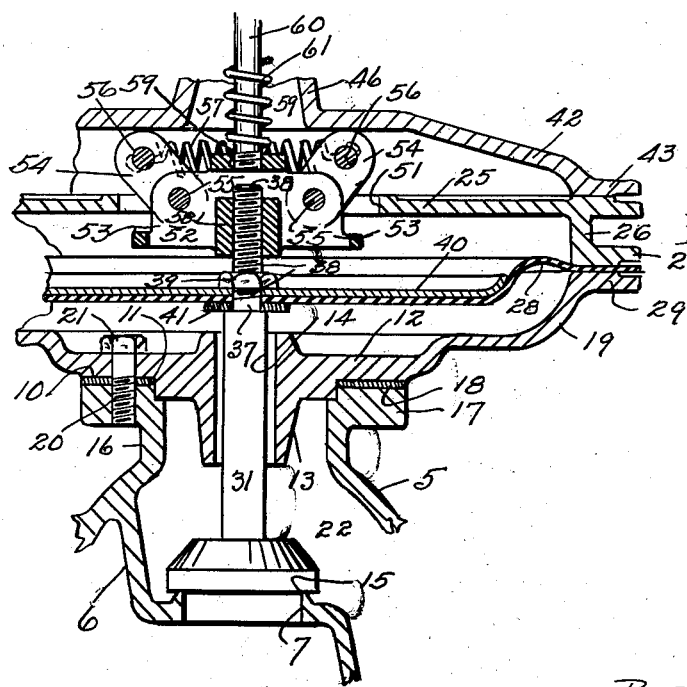
Figure 3 is a fragmentary vertical section of the valve and actuating mechanism therefor, with related parts, certain parts shown in elevation, and the valve shown in closed position.

Herein I have provided a valve casing 5 having a dividing wall 6 with a valve opening 7, an inlet port 8 and an outlet port 9. The lower surface of an upper control valve casing is illustrated at 10 for resting upon a gasket 11 which faces the upper surface 18 of a horizontal flange 17 integral with the sleeve or neck 16 rising integrally from said case 5, and thereby providing a central aperture for the main casing. The central base 12 of said control casing 10 has a central vertical opening 14 serving as a guide opening for an actuator later to be described. This central opening 14 is provided in an elongated tubular member which has a lower extension 13 integral with said base 12 and having coaxial opening therewith, as shown in Figs. 1 and 3.

The said opening 7 has an upwardly-directed and annular valve seat 15 designed for seating a suitable packing thereon for closing the valve. The upper casing 10 includes the lower section 19 provided with an annular flange 29, and an upper section 25 supporting a peripheral rim portion 26 and a flange 27 facing the flange 29, the peripheral edges of the diaphragm 28 being pressed between the flanges 27 and 29 of the said sections 19 and 25. It is to be understood that suitable threaded openings 20 are provided in the flange 17 which openings are aligned with similar openings in the base 12 for receiving clamping bolts 21 therein, as shown.

The packing 24 for application to the seat 15, is inserted peripherally in a shallow socket 36 in the valve member 22 which has a central and reduced cavity 23 therein, as well as a further reduced opening 30 for insertion therein of a reduced portion 32 of an actuating bar or pin 31 having operating connection at an upper reduced end 37 with a metal plate 40 facing the diaphragm 28. A threaded lower end 33 extends down into the cavity 23, and receives there a locking nut 34, as shown.

For securing the plate 40 and diaphragm upon the end 37, a supporting washer 41 encircles the said end and faces the lower surface of the diaphragm 28, while a nut 39 is mounted on the threaded end 38 of the pin or stem 31 above the reduced part 37. The plate and diaphragm will therefore be efficiently clamped between the nut and the washer 41, as will be evident. A repair plug 35 is provided in the central bottom wall of the casing 5. Above the section 25, there is provided a protecting cap 42 having a peripheral flange 43 for facing the upper surface of the flange integral with the upper section 25 of the control casing, the said cap flange 43 being perforated in alinement with the apertures in the other flanges 27 and 29, so that common locking bolts 44 may lock the several sections together by application of lower nuts 45.

A central and ordinarily round opening 51 will best be provided in the section 25 for reception therein, and reciprocating movement therethrough, of the actuating toggle mechanism now to be described, and its connection with the pin 31. Said toggle mechanism comprises a toggle frame 52 of general dome shape, hollow approximately through its inner chamber, but provided with a central roof plate from which yoke-shape ends 53 extend in pairs and parallel for attachment of other links 54 of the toggle. Axially of said frame 52 an internally threaded sleeve 58 is integral with the frame and receives therein the threaded end 38 of the pin 31.

It will now be understood that adjustment of the stem or pin 31, relative to the toggle frame 52 may be made by rotation of the pin, while the unitary vertical movement of the pin, valve member 22 and frame 52 with connected parts will result from the direct actuation thereof by the diaphragm 28 in the control casing 10, caused by varying pressure thereon from fluids in the casing 5 and thence upon the lower surface of the diaphragm. The opening 51 in the section 25 permits reciprocation therethrough by the toggle frame 52 in operating the valve 22.

Upwardly from and integral with the cap member 42, I provide a hollow and frusto-conical axial member 46 which has an internally threaded upper portion 47 which is substantially cylindrical on its inner surface to receive therein an externally-threaded sleeve 48 which is thus vertically adjustable in said frustum by the relative rotation of parts, the upper and integral closure member 49 having polygonal form for ready actuation by suitable tool, and a central opening 62 therein for movement therethrough of a vertical rod 60 for manual actuation of said toggle mechanism through the opening 51 in the upper section 25 above the diaphragm, as will later appear. The frame links 53 of either pair have pivoted thereon a corresponding pair of outer positioned links 54 by transverse pins 55, carried bodily upon said frame 52 as shown clearly in Fig. 2.

The outermost toggle links 54 are pivoted together in pairs by common ends of each pair fixed to a common transverse pin 55 mounted for rotary movement on said toggle frame 52, as above indicated. The opposite or outer ends of each pair of links 54 are mounted on a common transverse pin 56 to swing each such pair together, and the extreme ends of such pin project outward beyond the adjacent link 54 at 64 to provide means for attachment of coil springs 57 each of which connects the pins 56 of corresponding links 54 and thereby urging the outer links 54 to swing toward each other, when such coils 57 exert a force out of line with the pivots 55 on the links 53. The four pivot pins 55 and 56 are carried bodily by the toggle frame 52.

Said frame 52 has adjustable attachment with the valve stem 31 by the sleeve 58, and with the rod 60 by the threaded connection with the raised nut portion 59 integral with said frame 52, as shown in Fig. 3, so that the two stems 31 and 60 are substantially continuous and unitary, since both are screw-threaded in attachment with the common part 52, while permitting needed adjustment between such parts. Surrounding the rod 60 is a compression spring 61 which exerts a normal force of compression between the parts 49 and 59, thereby tending to lower the valve member 22 and close the valve.

Figure 2:
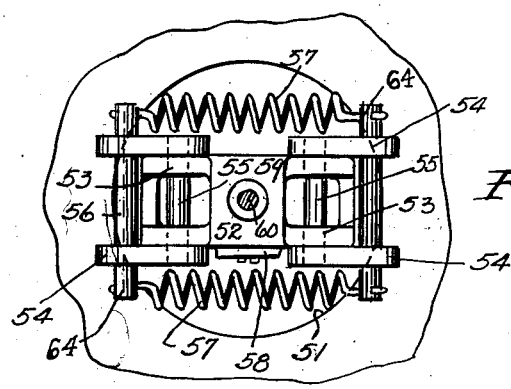
Figure 2 is a fragmentary transverse section of the toggle and closely related parts, taken in the plane indicated by the line 2—2 of Fig. 1.

The under surface of the cap member 42 will, when the valve stem 31 together with its attached frame 52 is raised, contact the inner ends of the links 54 and oppose further inward and upward swinging of these links under the force of the springs 57, as shown in Figs. 2 and 3. Relatively higher position of the toggle frame 52 will, by the consequent movement of the frame nut portion 59, permit the coils 57 to straighten the links of the toggle mechanism, and thereby hold the frame 52 raised and the valve open at 15. Sufficient fluid pressure must be exerted on the lower surface of the diaphragm 28 to hold the valve member 22 open, otherwise it will be overcome by the downward force exerted by the spring 61 against the frame 52. When it is desired to manually set the valve in open position an upward force may be exerted on the upper cap 63 on the rod 60 to lift the frame 52 against the force of spring 61, until the coils 57 are positioned below the level of the transverse pins 55 and thereby hold the valve 22 open.

In the operation of my invention, the normal position of the valve 22 is an open one, as shown in Fig. 1 of the drawings. This results from a condition in which the pressure of the fluid in the casing 5 and exerted against the lower surface of the diaphragm 28 tending to lift the valve member 22 from the seat 15, overcomes the downward pressure of the spring 61 upon the frame 52 and stem 31. Proper adjustments of the sleeve 48 and threaded stem end 38, will readily adapt the relative positions of parts to the fluid pressure intended to exist in the casings. The operating rod 60 will be readily guided in the aperture 62 of the cap 49, and suitable relative form of the opening 14 and the stem 31 will also guide the latter in its vertical movement in the opening, while at the same time permitting flow of fluid through the latter.

The raised position of the valve 22 is attained by manual force exerted upon the rod 60 by lifting the cap 63 until the springs 57 pull the ends 64 of the pins 56 toward each other, and thereby "set" the toggle links in the position shown in Fig. 1, as the fluid pressure upon the lower surface of the diaphragm 28 tends to raise the frame 52 against the opposing tendency of the spring 61. When the pressure in the main casing and in the lower section of the diaphragm casing is decreased, it fails to overcome the force of such latter spring, which forces the toggle frame 52 and its attached stem 31 downwardly and finally closes the valve at 15, in which position of parts the bent links 53 and 54 serve to retain the valve closed until a special upward force is exerted on the toggle frame 52, as by lifting manual force applied on the rod 60 or cap 63 reopening the valve 22 and setting the same in open position as before explained. The links 54 when in the position appearing in Fig. 3, exert very strong force to retain the valve closed until again "reset" by manual operation.

It will be evident that changes may be made in constructive details of my invention without departing from the spirit thereof as defined by the appended claims.

Having described my invention and set forth its merits, what I claim, and desire to secure by Letters Patent of the United States, is,—

1. In a valve having a passageway therethrough, a closure member for closing said passageway, a stem for said closure member, pressure responsive means secured to said closure member, resilient means normally acting to close said valve, a pair of oppositely extending links pivoted on said stem, a spring disposed between the outer end of one link and the outer end of the other link, said valve having a wall disposed above and a wall disposed below said links, said walls adapted to contact with said links, and consequent upon such further movement of said stem acting to cause the stem to maintain the valve in either position dependent upon the direction of movement of said stem.

2. A pressure regulator comprising a valve casing having a passageway therethrough and a pair of spaced parallel apertured walls, a closure member for closing said passageway, a stem for said closure member, said stem extending through the apertures in said walls, pressure reponsive means secured to said stem, resilient means normally acting to close said closure member, a pair of oppositely extending links pivoted to said stem and disposed between said walls, a spring disposed between the outer ends of said links, said spring acting to maintain the outer ends of said links in sliding engagement with one of said walls, whereby when the links are in engagement with one wall the spring acts to maintain the valve closed, and when the links are in engagement with the other of said walls the spring acts to maintain the closure member open, and a manually operable means to move the closure member to an open or a closed position as desired independent of the action of said pressure responsive means.

RALPH C. HUGHES.